United States Patent [19]

Burmeister

[11] Patent Number: 4,762,377
[45] Date of Patent: Aug. 9, 1988

[54] MATTRESS CONSTRUCTION FOR PNEUMATIC MATTRESS TRACK SYSTEM

[76] Inventor: Fredrik K. Burmeister, Lansatorpet 3, SF-02630 Esbo, Finland

[21] Appl. No.: 945,098
[22] PCT Filed: Mar. 27, 1986
[86] PCT No.: PCT/FI86/00032
    § 371 Date: Dec. 4, 1986
    § 102(e) Date: Dec. 4, 1986
[87] PCT Pub. No.: WO86/06038
    PCT Pub. Date: Oct. 23, 1986

[30] Foreign Application Priority Data
    Apr. 18, 1985 [FI] Finland .................... 851552

[51] Int. Cl.⁴ .................................... B62D 55/247
[52] U.S. Cl. .................................... 305/34
[58] Field of Search .................... 305/34, 39, 35 R; 180/9.1

[56] References Cited
U.S. PATENT DOCUMENTS

| 2,748,827 | 6/1956 | Kerr et al. | 305/34 |
| 3,244,458 | 4/1966 | Frost | 305/34 |
| 3,356,367 | 12/1967 | Tewksbury | 305/34 |
| 4,530,545 | 7/1985 | Bertelsen | 305/34 |

FOREIGN PATENT DOCUMENTS

| 950947 | 7/1974 | Canada | 305/34 |
| 543041 | 2/1942 | United Kingdom | 305/34 |

Primary Examiner—James B. Marbert
Attorney, Agent, or Firm—Darby & Darby

[57] ABSTRACT

A mattress construction for a pneumatic mattress track system, through which the mattress can withstand higher pulling forces, the transmission between drive wheels and mattress be made more efficient and the whole system made lighter.

2 Claims, 2 Drawing Sheets

MATTRESS CONSTRUCTION FOR PNEUMATIC MATTRESS TRACK SYSTEM

The invention applies to the mattress construction of the pneumatic mattress track system disclosed in the international PCT Publication No. WO 85/01710. For this publication we will use henceforward the shortname WO. The ability of the mattress construction presented in WO, to withstand pulling forces is restricted to 15–20% of the mattress bearing capacity, because only the sidewalls of the bags can take up the shear forces in the mattress. The ability of the mattress to withstand pulling forces can be significantly improved by equipping the mattress bags with internal diagonal sheets or straps that connect the upper part of a bag wall, that is perpendicular to the direction of travel, with the lower part of the opposite wall or the part of the bag bottom nearest to the opposite wall. The characteristics of the invention are defined in patent claim 1.

Another shortcoming of the mattress construction in WO is that the use of the hull facing wall of the mattress as a pulling element requires rollers, the same width as the mattress. Together with their shafting the rollers would be rather heavy. By utilizing one or more narrow pulling elements to which bars have been fastened transversely on the outside, and by fastening the mattress bags to the bars, one may use correspondingly narrow wheels instead of the full width rollers. This construction is practical only if one uses diagonal supports inside the bags which is clarified in the specification.

The mattress construction according to the present invention makes it possible to use narrow propulsion wheels with a light shafting. Moreover one can use optimal pulling elements for the propulsion. The mattresses of large vehicles can be manufactured more easily because the pulling part of the mattress consists of smaller parts. The overhaul of the mattress becomes easier because the bags are attached only to the bars. In the original construction in WO, the replacement bags are open at their tops and would have to be fastened also to the sides of the band.

Below the invention is explained in detail by means of an embodiment example illustrated in the accompanying drawings, wherein FIG. 1 is a side view of one end of a mattress track system, where the side plates and a side support have been left out to show the mattress construction more clearly.

Figure 1:
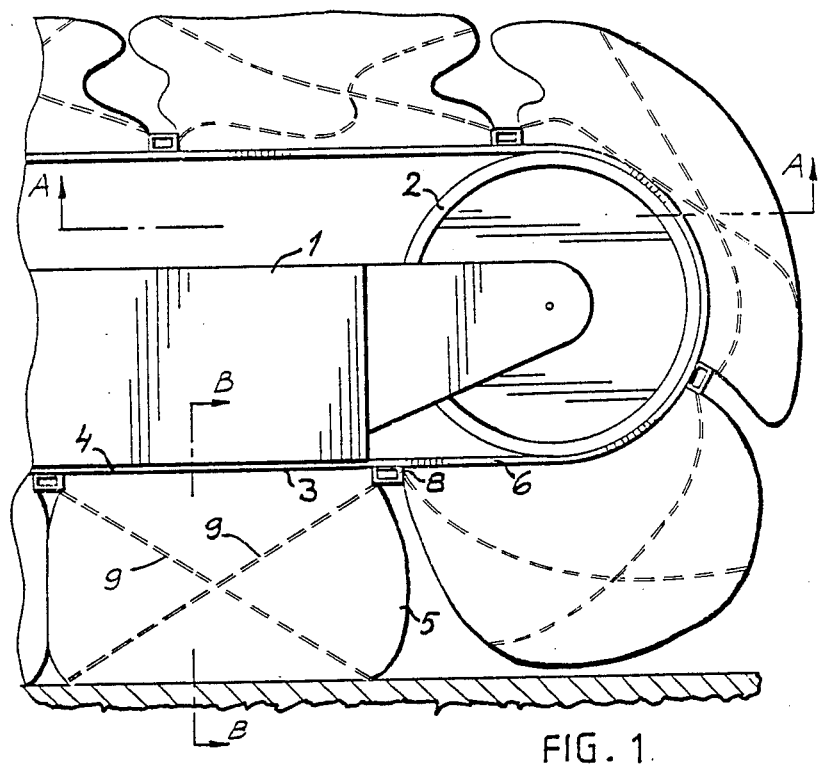
Figure 2:
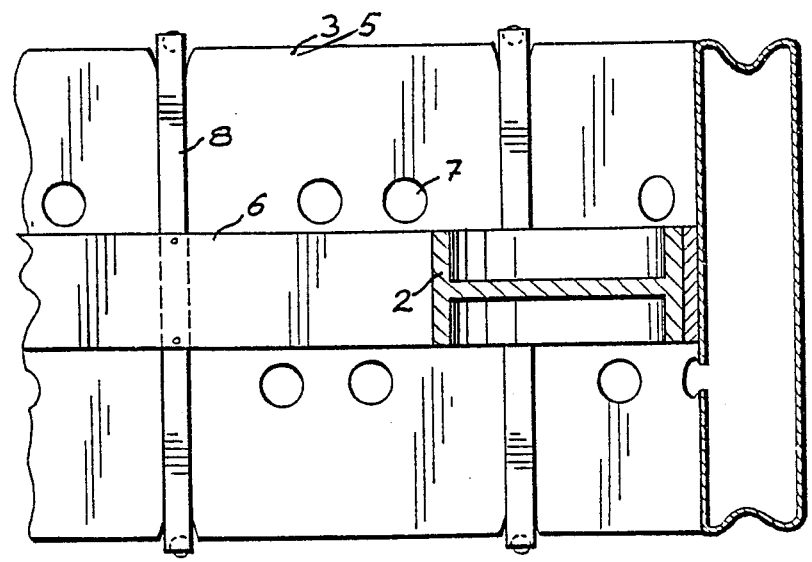
FIG. 2 is a horizontal section A—A of FIG. 1 through the drive wheel and the mattress. The inner side of the mattress facing the hull can be seen.

FIG. 1 shows the hull (1) of the pneumatic mattress track system, the drive wheel (2) at the end of the hull, the mattress in the form of discrete bags (5) running around these, the hull facing wall of which in the following is called "band (3)", and the air cushion space (4) between the hull (1) and the band (3). FIG. 2 shows the orifices (7) in the band (3) through which cushion air can fill the mattress. The above is technically in accordance with WO.

Figure 3:
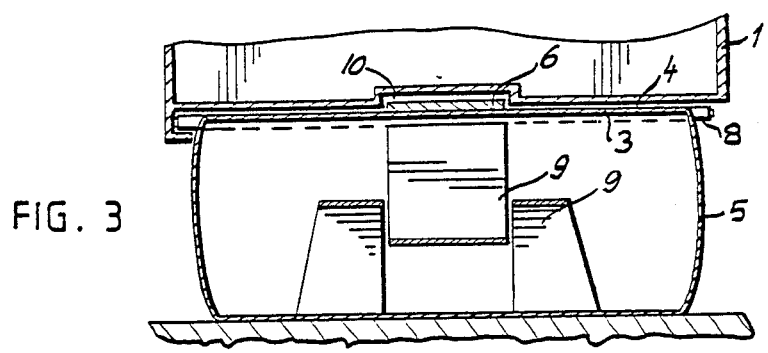
FIG. 3 is a cross section B—B of FIG. 1 through the mattress.

FIGS. 1 and 3 show the flexible diagonal supports (9) of the bags (5) which effectively can resist horizontal shear forces developing in the mattress when driving up or down hill or when pulling a load.

FIGS. 2 and 3 show best a mattress construction that can be used when the bags (5) are equipped with diagonal supports (9). The mattress is built up of, a pulling element (6), in this case a flat belt, bars (8), fastened transversely to the outside of the belt, and bags (5), fastened to the bars (8). FIG. 3 shows a recess (10) made in the bottom of the hull (1) for the pulling element (6) in order to permit the use of a thin air cushion (4).

Figure 4:
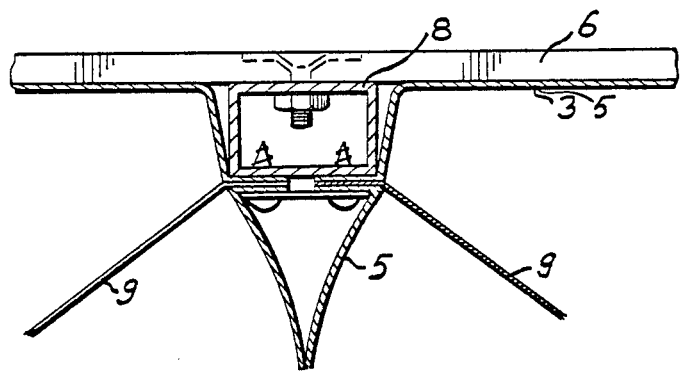
FIG. 4 is a cross section of a transverse bar and neighbouring bag parts showing the attachment of the mattress bags to the bars.
Figure 5:
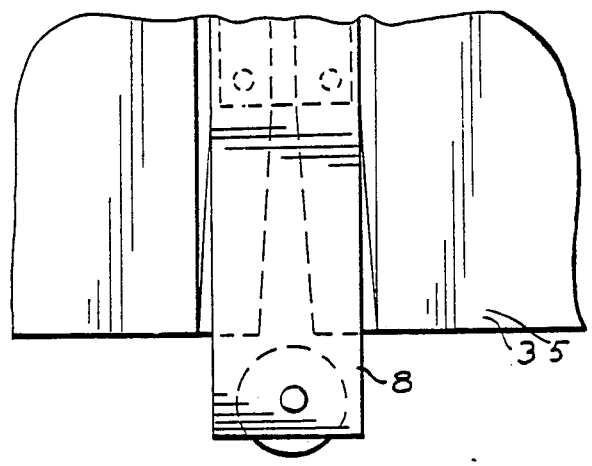
FIG. 5 is a top view of the end of a bar and the bag parts next to it.

The pulling element (6) stretches under strain causing a change in the spacing of bars (8). In order to avoid stresses in the bags (5) due to this, one may use the bag fastening method shown in FIGS. 4 and 5. The fastening of the bags is on a certain distance from the pulling element permitting the upper wall (3) of the bags to adjust itself according to the changing bar spacing. In order to avoid pulling strains in the bag end walls when the bags roll over wheels (2), due to the larger turning radius of the bag fastening points in relation to the wheel radius, the fastening of the bags to the bars has to end inward of the bag end walls, as shown in FIG. 5. This leads to that the end walls cannot effectively take up longitudinal shear forces in the mattress. Thus the diagonal supports (9) are essential.

In the embodiment example a flat belt has been used a pulling element. One could equally well use toothed belts, V-belts, metal bands, wires or different kinds of chains, all belonging to the concept of a pulling element. In the embodiment example only one pulling element has been used in the mattress but in accordance with the invention one may use several pulling elements in parallel which may be situated at different distances from the mattress center line, for example at the ends of the bars.

I claim:

1. A pneumatic mattress track system used as a construction element of a vehicle comprising
    a frame, at least two rollers rotatably positioned at opposite ends of said frame,
    a plurality of discrete bags attached to a base,
    said bags and said base defining in combination an endless hollow mattress running around said two rollers,
    an air cushion space defined between the frame and the base, a pressurized fluid is fed into said air cushion space in such a way that a part of the mattress running under the frame is automatically filled with the pressurized fluid through a plurality of inlet orifices,
    each said discrete bag comprising a supporting part attached to the base and engaging part for engagement with the ground, at least two flexible supports crossing the entire interior of said each inflated bag in opposite to each other diagonal directions, one end of each said support is fixedly attached to the bag at an area of junction between the base and the supporting part, a second end of each said support fixedly attached to an area of the engaging part diagonally opposed to said area of junction when the bag is inflated, said supports interconnecting the diagonally opposed parts of each said bag enhancing ability of the bags and the mattress to withstand shear forces resulted during operation of the mattress track system.

2. A pneumatic mattress track system according to claim 1 further comprising a plurality of bar arrangements attached to said base, each said bar being positioned between an exterior of two said adjacent bags in such a manner that the first end of the support embedded in a wall of the bag is fixedly attached to said bar.

* * * * *